US008805871B2

(12) United States Patent
Ajmera et al.

(10) Patent No.: US 8,805,871 B2
(45) Date of Patent: *Aug. 12, 2014

(54) CROSS-LINGUAL AUDIO SEARCH

(75) Inventors: Jitendra Ajmera, New Delhi (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,296

(22) Filed: Aug. 29, 2012

(65) Prior Publication Data
US 2013/0006604 A1    Jan. 3, 2013

Related U.S. Application Data

(63) Continuation of application No. 13/170,784, filed on Jun. 28, 2011.

(51) Int. Cl.
*G06F 17/30*    (2006.01)

(52) U.S. Cl.
CPC ............................ *G06F 17/30755* (2013.01)
USPC ............................................. 707/769; 704/2

(58) Field of Classification Search
None
See application file for complete search history.

(56) References Cited

U.S. PATENT DOCUMENTS

| | | | | |
|---|---|---|---|---|
| 7,257,533 B2 * | 8/2007 | Charlesworth et al. | ....... | 704/249 |
| 7,289,958 B2 * | 10/2007 | Bernard et al. | ................ | 704/255 |
| 7,295,979 B2 * | 11/2007 | Neti et al. | ..................... | 704/243 |
| 7,472,061 B1 * | 12/2008 | Alewine et al. | ................ | 704/243 |
| 7,483,828 B2 * | 1/2009 | Abir | .................................. | 704/8 |
| 8,121,841 B2 * | 2/2012 | Badino et al. | ................. | 704/260 |
| 8,260,615 B1 * | 9/2012 | Nakajima et al. | ............. | 704/257 |
| 8,527,269 B1 * | 9/2013 | Kapur et al. | .................... | 704/235 |
| 8,645,289 B2 * | 2/2014 | Bennett et al. | ................... | 706/12 |
| 2002/0040296 A1 * | 4/2002 | Kienappel | ...................... | 704/220 |
| 2002/0152068 A1 * | 10/2002 | Neti et al. | ...................... | 704/236 |
| 2003/0061052 A1 * | 3/2003 | Breuer | ........................... | 704/266 |
| 2003/0083860 A1 * | 5/2003 | Abir | ................................ | 704/7 |
| 2004/0210438 A1 * | 10/2004 | Gillick et al. | .................. | 704/254 |
| 2009/0006097 A1 * | 1/2009 | Etezadi et al. | ................. | 704/260 |
| 2009/0248395 A1 * | 10/2009 | Alewine et al. | ..................... | 704/7 |
| 2010/0299133 A1 * | 11/2010 | Kopparapu et al. | ............... | 704/2 |
| 2011/0035219 A1 * | 2/2011 | Kadirkamanathan et al. | ........................... | 704/239 |
| 2011/0218806 A1 * | 9/2011 | Alewine et al. | ................ | 704/251 |
| 2012/0059814 A1 * | 3/2012 | Sejnoha et al. | ................ | 707/707 |
| 2012/0278060 A1 * | 11/2012 | Cancedda et al. | ................ | 704/2 |
| 2012/0278061 A1 * | 11/2012 | Weinstein et al. | ................ | 704/2 |
| 2012/0278302 A1 * | 11/2012 | Choudhury et al. | .......... | 707/709 |

OTHER PUBLICATIONS

Parada, Carolina et al. "Query-by-Example Spoken Term Detection for OOV Terms," Automatic Speech Recognition & Understanding, ASRU 2009, IEEE Workshop Nov. 13-Dec. 17, 2009, pp. 404-409.*

(Continued)

*Primary Examiner* — Richard Bowen
(74) *Attorney, Agent, or Firm* — Ference & Associates LLC

(57) ABSTRACT

Methods and arrangements for executing an audio search. A search query in a first language variety is accepted, the search query being in a form of at least one of: text and audio. A corpus of material in the first language variety is accessed, and first language variety baseforms are obtained via data obtained from a second language variety. A first language variety phonetic model is built, and the first language variety phonetic model and the second language variety are employed in executing an audio search based on the accepted search query.

11 Claims, 3 Drawing Sheets

(56) References Cited

OTHER PUBLICATIONS

Bartkova et al., "Automatic Detection of Foreign Accent for Automatic Speech Recognition," ICPhS XVI. ID1126, Saarbrucken, Aug. 6-10, 2007, pp. 2185-2188, www.icphs2007.de.*

Goronzy et al., "Automatic Pronunciation Modelling for Multiple Non-Native Accents," Proc. ASRU '03, pp. 123-128, 2003.*

Kessens, J., "Non-Native Pronunciation Modeling in a Command & Control Recognition Task: A Comparison Between Acoustic and Lexical Modelling," TNO Human Factors, Soesterberg, The Netherlands.*

Kumar et al., "A Large-Vocabulary Continuous Speech Recognition System for Hindi," IBM J. Res. & Dev., 48:5/6, pp. 703-715, Sep./Nov. 2004.*

Neri et al., "Automatic Speech Recognition for Second Language Learning: How and Why It Actually Works," 15.sup.th ICPhS, Barcelona, A2RT, Dept. Language and Speech, University of Nijmegen, The Netherlands.*

* cited by examiner

CROSS-LINGUAL AUDIO SEARCH

CROSS REFERENCE TO RELATED APPLICATION

This application is a continuation of U.S. patent application Ser. No. 13/170,784, entitled SYSTEMS AND METHODS FOR CROSS-LINGUAL AUDIO SEARCH, filed on Jun. 28, 2011, which is incorporated by reference in its entirety.

BACKGROUND

Automatic speech recognition (ASR) has evolved to the point where audio searching over audio data has become commonplace. However, to date this has been limited to but a handful of more commonly used languages (e.g., English, German, Hindi). It is very often the case that there are not enough resources for training an ASR system for a given language that may not be so widely used.

More particularly, audio search has proven to be a very useful interface, particularly in situations where one wants to find relevant audio segments out of a huge volume of content. Many efforts have been made in past to solve this problem. One approach is the employment of large vocabulary continuous speech recognition (LVCSR), which generates text transcripts of the audio data and then applies standard textual information retrieval approaches to generate search results. In the context of speech, it has been found useful to use word lattices instead of 1-best text transcripts. Such an approach is discussed in "Lattice-based search for spoken utterance retrieval," HLT-NAACL 2004, and "Rapid and accurate spoken term detection," INTERSPEECH 2007. The limitations of such an approach becomes evident when considering the limitation that a fixed vocabulary imposes on the searchable terms, even within the same language, while such an approach cannot even be extended to languages other than a target language.

Accordingly, phonetic representation of the audio data has been found to be desirable in these situations, where it is anticipated that the search queries may involve words which were never seen during the training process. Such approaches has been explored as well, e.g., as discussed in "Query by example spoken term detection for OOV terms," ASRU 2009. However, since most of the needed components such as a dictionary, acoustic models and language models are language-dependent, it is not clear how the approach can be applied in situations where resources for a language are not available.

Other approaches have been investigated which do not depend on speech recognition process at all. These approaches rely on an intermediate representation such as posteriogram of the speech signal and some form of dynamic time warping to capture relevant patterns. While these approaches are suitable for language-independent search, the memory and computational requirements of these approaches are prohibiting.

BRIEF SUMMARY

In summary, one aspect of the invention provides a method comprising: accepting a search query in a first language variety, the search query being in a form of at least one of: text and audio; accessing a corpus of material in the first language variety; obtaining first language variety baseforms via data obtained from a second language variety; building a first language variety phonetic model; and employing the first language variety phonetic model and the second language variety to execute an audio search based on the accepted audio search query.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
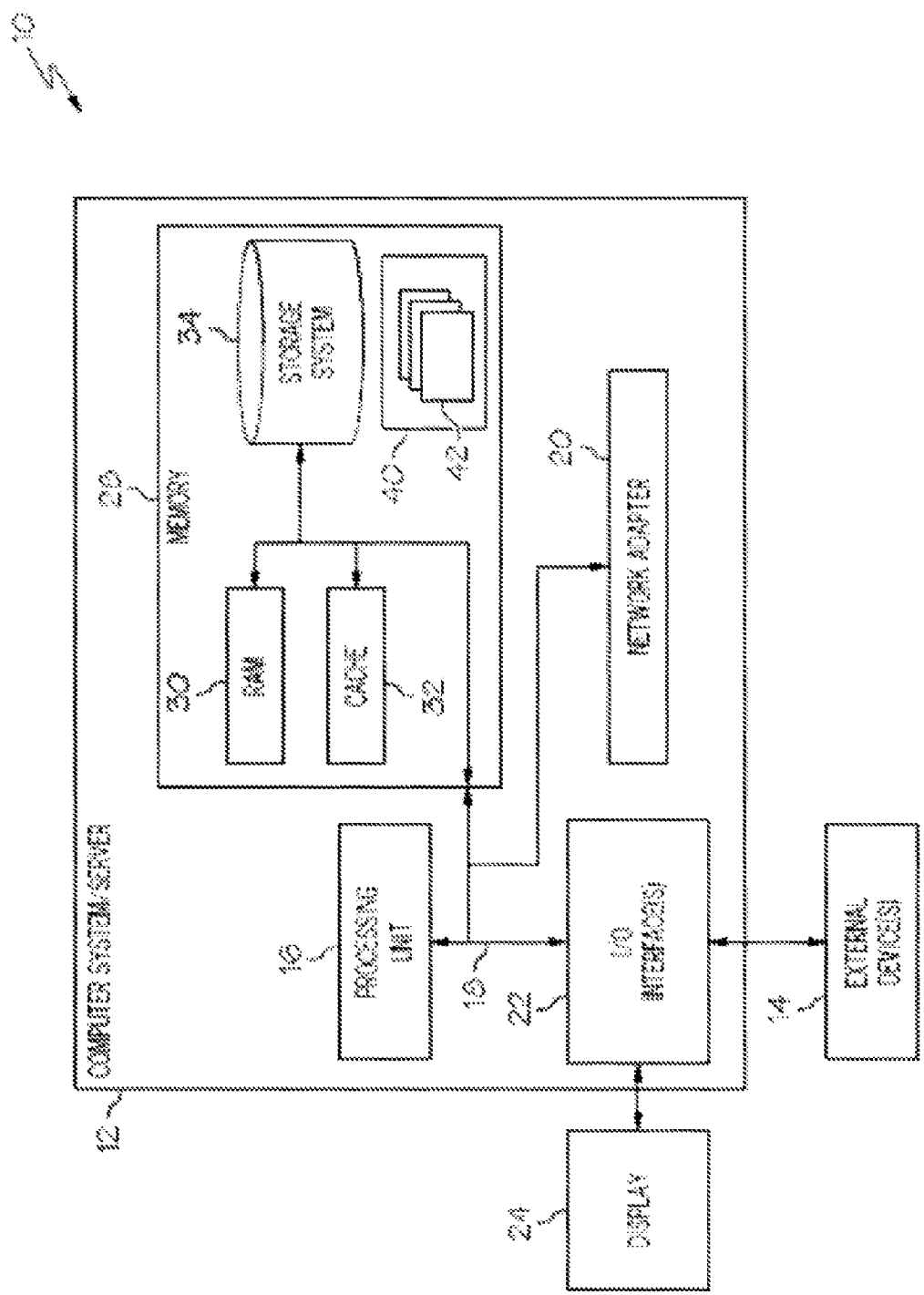
FIG. 1 illustrates a block diagram representing a computer system in which at least one embodiment of the invention may be employed.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor or processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, at least one application program, other program modules, and program data. Each of the operating system, at least one application program, other program modules, and program data or some combination thereof, may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enable a user to interact with computer system/server 12; and/or any devices (e.g., network card, modem, etc.) that enable computer system/server 12 to communicate with at least one other computing device. Such communication can occur via I/O interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
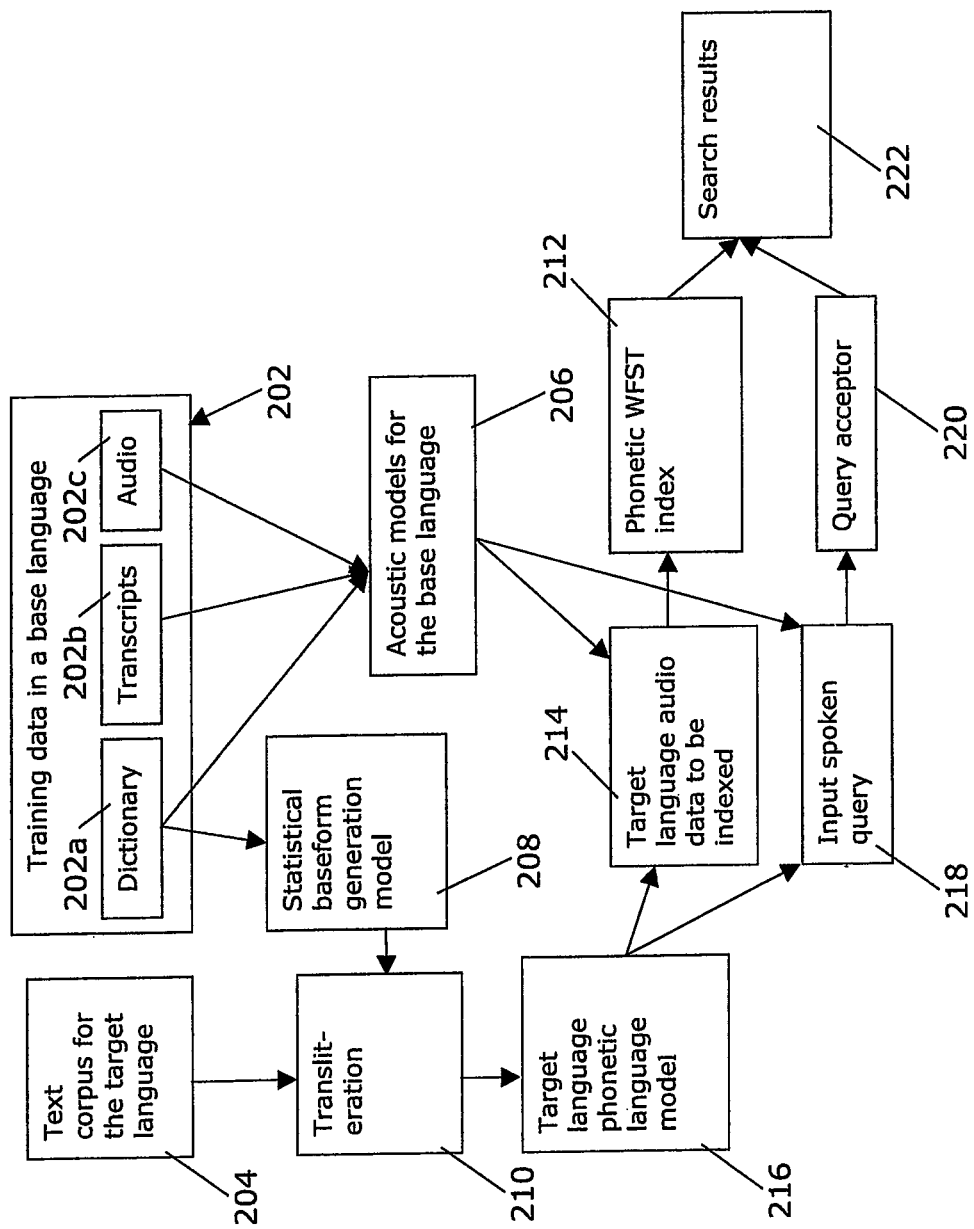
FIG. 2 schematically illustrates, by way of a flow diagram, an arrangement and process for phonetic recognition in accordance with at least one embodiment of the invention.

The disclosure now turns to FIG. 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIG. 2 can be performed or utilized by way of a processing unit or units and system memory such as those indicated, respectively, at 16 and 28 in FIG. 1, whether on a server computer, a client computer, a node computer in a distributed network, or any combination thereof.

Generally, the creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a program creator may create a VoiceSite or modify an existing VoiceSite using a cellular phone. The Spoken Web is an ideal solution for a large part of the world were the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

Generally, the World Wide Telecom Web and interconnected voice applications (VoiceSites) and can be accessed by any voice-capable (e.g., landline or cellular) telephone. In the course of an ordinary phone call, the user interacts with a service or other application through speech or DTMF (dual tone multi frequency, or the signal to the phone company that is generated when one presses the touch keys of a telephone, which can also be referred to as "touch tone" or "telephone touch tone").

By way of further background in accordance with at least one embodiment of the invention, a SWAF (Spoken Web Application Framework) can be used in creating VoiceSites. Background information on SWAF may be found in A. Kumar et al., "The Spoken Web Application Framework User Generated Content and Service Creation through low-end mobiles" in 7th International Cross-Disciplinary Conference on Web Accessibility (W4A; collocated with World Wide Web Conference, 2010).

Although embodiments of the invention are not restricted to the use of voice applications such as VoiceSites, they provide an example of a setting in which embodiments of the invention may readily and advantageously be employed. Thus, audio search as described and understood herein may readily be applied to searching among audio documents that may be present in a voice application such as VoiceSites, as may other actions that can be undertaken with or in the context of audio documents (e.g., transcribing audio documents to text).

Broadly contemplated herein, in accordance with at least one embodiment of the invention, are methods and arrangements for facilitating audio search and ASR system training in the context of languages where sufficient resources are not available. As such, arrangements are contemplated for estimating a language model component of an ASR system for a language from text resources, while an acoustic model component can be borrowed from a "similar" language. It should be understood that the term "language", as employed herein, may be taken to mean "language variety", which itself refers to what nominally be a language, dialect, accent, register, style or other sociolinguistic variation, including a standard language. (For background purposes, for a discussion of the concept of language varieties, as understood in the linguistic arts, see, e.g., Meecham, Marjorie and Janie Rees-Miller (2001), "Language in social contexts," in W. O'Grady, J. Archibald, M. Aronoff and J. Rees-Miller (eds), *Contemporary Linguistics*, pp. 537-590, Boston: Bedford/St. Martin's.)

Essentially, in accordance with at least one embodiment of the present invention, an attempt is made to exploit the fact that the language model aspect of the ASR system can be trained using language-specific resources. The resources required to train the language model can be obtained from a variety of sources including the world-wide-web. The text corpus is first transliterated using the script of another "similar" language. The baseforms (word-to-phonetic mappings) for the words in the "target" language are derived using a statistical model which is trained using a dictionary in a "similar" language. The statistical baseform-estimator is trained on a "similar" language, and therefore the resulting "target" language phoneme set will be a subset of the "similar" language phoneme set. This phonetic language models is used in tandem to get phonetic representation of the audio data in tandem with the acoustic model of the "similar" language.

Generally, language identification has proven to be a mature technology, achieving more than 95% accuracy in a set of 20 languages. While conventional systems tend to use parallel phonetic recognition systems, reasonable accuracies have been obtained using unsupervised techniques using shifted-delta-cepstral coefficients (SDC) features. Statistical models of these SDC features can be trained using unlabeled data in each language and then hypothesis testing likelihood ratio is used to rank similarity across a pair of languages. (For background purposes, the following publication discusses SDC features and how they can be used for language identification: "Approaches to language identification using Gaussian Mixture Models and shifted delta cepstral features", Pedro. A. T., E. Singer, M. A. Kohler and J. R. Deller, pp. 89-92, International Conference on Spoken Language processing, 2002.) In accordance with at least one embodiment of the invention, such ranking is used in order to decide if audio search in one language can be performed using a speech recognizer in another, "similar" language or language variety). Such a "similar" language or language variety, along with the "target" language or language variety, can be taken from a group of languages or language varieties where mainly the works and their pronunciations are expected to vary while the overall phoneme set is expected to remain largely similar.

For example, in northern India, a group of languages such as Marathi, Gujarati, Bengali, Punjabi and Hindi and their dialects can be considered "similar" to one another. Similarly, varying dialects of one nominal language, e.g. Italian, can be considered as "similar" language varieties, provided that the overall phoneme set is generally consistent between the language varieties.

In accordance with at least one embodiment of the invention, and now turning to FIG. 2, a phonetic recognizer employs a phonetic language model 216 and acoustic models 206 in a manner now to be described. Henceforth, a "target" language may be considered to be a language, which may be less commonly used, for which an audio search is desired while a "base" language may be considered to be a "similar" language that may be more commonly used. As such, training data 202 for a base language are provided, including a dictionary 202a, audio data 202c and text transcripts 202b of the audio data, as is a text corpus 204 for the target language. The training data 202 for a "similar" language is assumed here to be readily available, while the text corpus 204 may derive from any of a wide variety of text documents available from the world-wide-web or other sources.

Thus, in accordance with at least one embodiment of the invention, the phonetic language model of the target language is trained using the text resources 204, as such resources are relatively easy to obtain for a very wide variety of languages in the context of the world-wide-web (among other possible sources). The text (e.g., which could be of a large scale of magnitude, such as about 20,000 or more sentences) is then converted (210), i.e., transcribed or transliterated, and phonetic representation (baseform) obtained for each word in the text in order to obtain the phonetic language model. This is done by training a statistical baseform estimator (or generation model) 208 using the base language dictionary 202a (itself involving a word to phoneme mapping database).

As such, in accordance with at least one embodiment of the invention, the words in the text corpus 204 are transliterated (210) using the script of the base language via a suitable known transliteration system, whereupon phonetic baseforms are estimated using the statistical model to thereby form the target language phonetic language model 216. Acoustic models for the base language (206) are also derived from the dictionary 202a, transcripts 202b and audio 202c of the base language in any of a wide variety of suitable manners. These two components, then, the target language phonetic language model 216 and base language acoustic models 206 are employed in tandem by way of conducting a target language audio search.

In accordance with at least one embodiment of the invention, spoken utterances are then decoded by the phonetic recognizer in a manner now to be described. The phonetic recognizer generates not only the most likely phonetic sequence but N-best most likely sequences. (An illustrative and non-restrictive example value of N would be 5.). These multiple hypotheses are expressed in the form of a lattice.

In accordance with at least one embodiment of the invention, at search time, a 218 query (either in spoken form or text form) is represented as a phonetic lattice. If the input is a spoken query, the phonetic recognizer is used to obtain a phonetic lattice, using the procedure for spoken utterances discussed immediately hereinabove. If the input query is in text form, phonetic reference pronunciations are derived using either the "target" language dictionary or the statistical baseform-estimation model 208. These pronunciations are written down in the form of a phonetic lattice and finally converted to a query acceptor 220.

In accordance with at least one embodiment of the invention, the search is then performed by comparing the query-phonetic-lattice (from 220) against the content phonetic lattices (212). A number of techniques are available; for background purposes, an example of carrying this out may be found in "A comparison of query-by-example methods for spoken-term-detection", INTERSPEECH 2009 and "Query by example spoken term detection for OOV terms" ASRU 2009. Essentially, target language audio data 214 is to yield a phonetic WFST (weighted finite state transducer) index 212, and the query acceptor 220 is composed with the WFST index 212 to yield search results 222. Essentially, the WFST index 212 provides an efficient arrangement for searching throughout the audio data 214. It maps every possible substring of phonemes to a set of utterances in which the substring is found. In the context of such a framework, the search is linear in terms of the size of the query string and the number of indices of the automata in which the string is found.

In the context of the framework discussed above with respect to FIG. 2, in accordance with at least one embodiment of the invention, it can thus be appreciated that for a target language $L_x$ without any ASR training resources, a phonetic language model ($L_{x1}$) 216 can be obtained via the following steps. First, text data 204 are collected for $L_x$ from sources such as the world-wide-web and/or at least one other available text corpus. The words in $L_x$ are then transliterated or transcribed (210) using the script of a base language $L_y$, wherein a ASR system does exist for $L_y$, including acoustic models 206 ($L_{ya}$) and a dictionary 202a ($L_{yd}$). A statistical baseform-estimation-model 208 is trained using the dictionary 202a ($L_{yd}$). Thence, baseforms of the words in $L_x$ are obtained using model 208, and model 216 itself ($L_{x1}$) is trained by using these baseforms and the transliterated text corpus.

In accordance with at least one embodiment of the invention, it can then be appreciated that the language model 216 for $L_x$ ($L_{x1}$) is used in tandem with the acoustic model 206 for $L_y$ ($L_{ya}$) to yield a phonetic representation 212 of the audio data in $L_x$. The input query 218, in spoken or text form, is also converted into a phonetic representation (220). The two representations (212, 220) are then compared to generate the search results 222.

Figure 3:
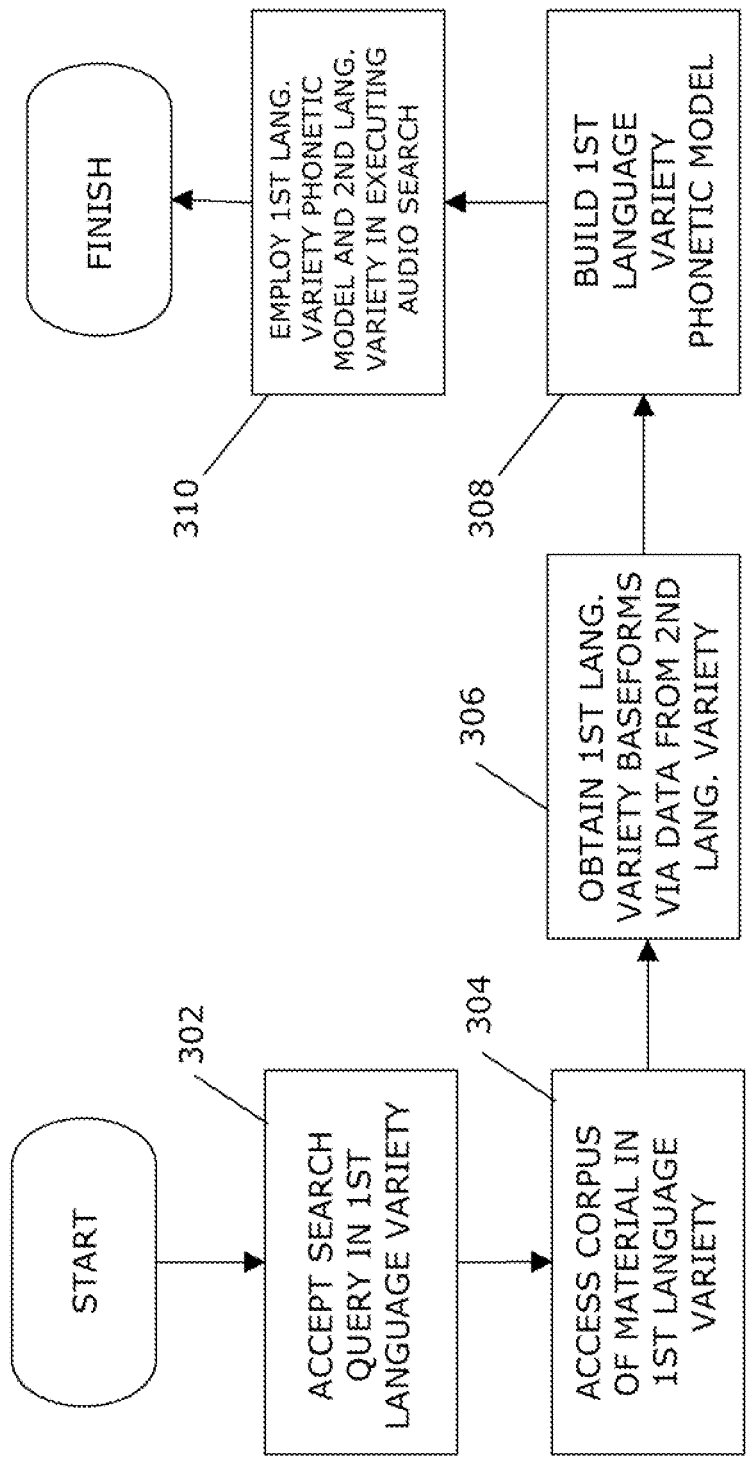
FIG. 3 illustrates a flow chart which sets forth a process more generally for executing an audio search, in accordance with at least one embodiment of the invention.

FIG. 3 sets forth a process more generally for executing an audio search, in accordance with at least one embodiment of the invention. It should be appreciated that a process such as that broadly illustrated in FIG. 3 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 3 can be performed by way a processing unit or units and system memory such as those indicated, respectively, at 16 and 28 in FIG. 1.

As shown in FIG. 3, a search query in a first language variety is accepted (302), the search query being in a form of at least one of: text and audio. A corpus of material in the first language variety is accessed (304), and first language variety baseforms are obtained via data obtained from a second language variety (306). A first language variety phonetic model is built (308), and the first language variety phonetic model and the second language variety are employed in executing an audio search based on the accepted search query (310).

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
accepting a search query in a first language variety, the search query being in a form of at least one of: text and audio;
accessing a corpus of material in the first language variety;
determining similarity of a second language variety with respect to a first language variety;
choosing the second language variety based on determining that the first language variety baseforms can be obtained via data from the second language variety, and at least one selection criterion;
the at least one selection criterion comprising a ranking from among ranked pairs of language varieties, the ranked pairs being ranked on a basis of determined similarity between language varieties;
obtaining first language variety baseforms via data obtained from the second language variety;
thereupon building a first language variety phonetic model, based on the first language variety baseforms obtained via data obtained from the second language variety; and
executing an audio search based on the accepted search query, via employing the first language variety phonetic model and the second language variety.

2. The method according to claim 1, further comprising:
pre-processing search data in the first language variety;
said obtaining comprising obtaining first language variety baseforms via employing models trained on the second language variety; and
said executing comprises searching the search data for the accepted search query via comparing the accepted search query and the search data.

3. The method according to claim 2, wherein:
said obtaining comprises obtaining baseforms for words in the first language variety from the corpus; and
said pre-processing comprises pre-processing search data in the first language variety via employing phonetic models from both the first language variety and the second language variety.

4. The method according to claim 1, wherein said accessing comprises accessing corpus of first language text material from public sources and transliterating the text material into a script of the second language variety.

5. The method according to claim 1, wherein said executing comprises executing the audio search via employing a statistical model trained using dictionary data of the second language variety.

6. The method according to claim 1, wherein said executing comprises executing the audio search via employing at least one acoustic model of the second language variety and the phonetic language model of the first language variety.

7. The method according to claim 1, wherein said executing comprises generating a phonetic index for search data.

8. The method according to claim 7, wherein said generating comprises generating a phonetic lattice of the search query in the first language variety.

9. The method according to claim 8, wherein the phonetic index of the search data comprises a phonetic lattice representation of the search data.

10. The method according to claim 8, wherein:
- said accepting comprises accepting a search query in the form of text; and
- said generating of a phonetic lattice comprises generating at least one baseform of the accepted search query and converting the at least one baseform to a phonetic lattice.

11. The method according to claim 8, wherein:
- said accepting comprises accepting a search query in the form of audio; and
- said generating of a phonetic lattice comprises generating a phonetic lattice of the search query directly via employing an acoustic model of the second language variety and the phonetic language model of the first language variety.

* * * * *